United States Patent
Kunin et al.

(10) Patent No.: US 12,282,533 B2
(45) Date of Patent: Apr. 22, 2025

(54) SYSTEM AND METHOD FOR DETECTING AGENT SHARING CREDENTIALS

(71) Applicant: Nice Ltd., Ra'anana (IL)

(72) Inventors: Maria Michaela Kunin, San Rafael, CA (US); Cijo Mathew, Alpharetta, GA (US); Jesse Goldblatt, Asheville, NC (US)

(73) Assignee: Nice Ltd., Ra'anana (IL)

( * ) Notice: Subject to any disclaimer, the term of this patent is extended or adjusted under 35 U.S.C. 154(b) by 184 days.

(21) Appl. No.: 18/093,064

(22) Filed: Jan. 4, 2023

(65) Prior Publication Data
US 2024/0220592 A1   Jul. 4, 2024

(51) Int. Cl.
*G06F 21/55*   (2013.01)
*G06F 21/32*   (2013.01)

(52) U.S. Cl.
CPC ............ *G06F 21/32* (2013.01); *G06F 21/554* (2013.01); *G06F 2221/033* (2013.01)

(58) Field of Classification Search
CPC ... G06F 21/32; G06F 21/554; G06F 2221/033
See application file for complete search history.

(56) References Cited

U.S. PATENT DOCUMENTS

| | | | |
|---|---|---|---|
| 6,246,988 B1 * | 6/2001 | Schier | G10L 17/00 704/E17.003 |
| 8,056,128 B1 | 11/2011 | Dingle et al. | |
| 8,145,562 B2 | 3/2012 | Wasserblat et al. | |
| 8,225,413 B1 | 7/2012 | De et al. | |
| 8,646,060 B1 | 2/2014 | Ben Ayed | |
| 9,042,867 B2 | 5/2015 | Gomar | |
| 9,237,232 B1 | 1/2016 | Williams et al. | |
| 9,620,123 B2 | 4/2017 | Faians et al. | |

(Continued)

OTHER PUBLICATIONS

D. Snyder, D. Garcia-Romero, G. Sell, D. Povey and S. Khudanpur, "X-Vectors: Robust DNN Embeddings for Speaker Recognition," *2018 IEEE International Conference on Acoustics, Speech and Signal Processing (ICASSP)*, 2018, pp. 5329-5333.

(Continued)

*Primary Examiner* — Vu V Tran
(74) *Attorney, Agent, or Firm* — PEARL COHEN ZEDEK LATZER BARATZ LLP

(57) ABSTRACT

A computerized system and method may detect potentially fraudulent events where agent access credentials are used by an unauthorized party, based on calculations, comparisons, and analyses performed using recorded audio data, and execute corrective actions based on calculated results. A computerized system including a processor or a plurality of processors, a communication interface to communicate via a communication network with one or more remote computing devices, and a memory including a data store of a plurality of data items—which may, e.g., describe the remote computing devices and/or interactions involving the remote computing devices—may compare a plurality of voice signatures, which may describe calls from a plurality of remote computers, to a plurality of corresponding voice models—and, if the comparison results in a mismatch, perform a plurality of corrective actions (which may include, e.g., terminating one or more calls involving one or more remote computers).

18 Claims, 10 Drawing Sheets

---

Step 1010: Compare a Voice Signature to a Plurality of Voice Models

Step 1020: If the Comparison Results in a Mismatch, Automatically Terminate One or More Calls Associated with the Signature

(56) References Cited

U.S. PATENT DOCUMENTS

| | | | |
|---|---|---|---|
| 9,917,833 | B2 | 3/2018 | Gomar |
| 10,110,738 | B1 | 10/2018 | Sawant et al. |
| 10,659,588 | B1 | 5/2020 | Guan et al. |
| 10,678,899 | B2 | 6/2020 | Keret et al. |
| 10,701,067 | B1 | 6/2020 | Ziraknejad et al. |
| 10,764,752 | B1 | 9/2020 | Avetisov et al. |
| 10,854,204 | B2 | 12/2020 | Faians et al. |
| 10,887,307 | B1 | 1/2021 | Newstadt et al. |
| 10,911,600 | B1 | 2/2021 | Frenkel et al. |
| 11,039,012 | B2 | 6/2021 | Michaeli et al. |
| 11,108,910 | B2 | 8/2021 | Frenkel et al. |
| 2004/0249650 | A1 | 10/2004 | Freedman et al. |
| 2005/0060157 | A1* | 3/2005 | Daugherty ............... G07C 9/37 704/273 |
| 2005/0125226 | A1* | 6/2005 | Magee .................... G10L 17/04 704/E17.006 |
| 2008/0256613 | A1* | 10/2008 | Grover ................... G10L 17/00 704/235 |
| 2010/0107225 | A1 | 4/2010 | Spencer et al. |
| 2011/0046938 | A1 | 2/2011 | Morizawa et al. |
| 2011/0206198 | A1 | 8/2011 | Freedman et al. |
| 2013/0216029 | A1 | 8/2013 | Pawlewski |
| 2015/0055763 | A1 | 2/2015 | Guerra et al. |
| 2015/0142446 | A1 | 5/2015 | Gopinnathan et al. |
| 2015/0256554 | A1 | 9/2015 | Sakakibara et al. |
| 2015/0269941 | A1 | 9/2015 | Jones |
| 2015/0281446 | A1 | 10/2015 | Milstein et al. |
| 2016/0087957 | A1 | 3/2016 | Shah et al. |
| 2016/0142534 | A1 | 5/2016 | Guerra et al. |
| 2016/0149883 | A1 | 5/2016 | Arunkumar et al. |
| 2017/0099278 | A1 | 4/2017 | Ducatel et al. |
| 2017/0148009 | A1 | 5/2017 | Perez Lafuente |
| 2017/0185765 | A1 | 6/2017 | Pang et al. |
| 2017/0272418 | A1 | 9/2017 | Kim et al. |
| 2017/0324737 | A1 | 11/2017 | Evans |
| 2017/0331816 | A1 | 11/2017 | Votaw et al. |
| 2017/0331817 | A1 | 11/2017 | Votaw et al. |
| 2018/0032707 | A1 | 2/2018 | Sakamoto et al. |
| 2018/0032755 | A1 | 2/2018 | Odinak |
| 2018/0082689 | A1 | 3/2018 | Khoury et al. |
| 2018/0103341 | A1 | 4/2018 | Moiyallah, Jr. et al. |
| 2018/0152446 | A1 | 5/2018 | Gomar |
| 2018/0234411 | A1 | 8/2018 | Masiero et al. |
| 2018/0332016 | A1 | 11/2018 | Pandey et al. |
| 2019/0037081 | A1 | 1/2019 | Rao et al. |
| 2019/0044942 | A1 | 2/2019 | Gordon et al. |
| 2019/0080066 | A1 | 3/2019 | Van Os et al. |
| 2019/0104121 | A1 | 4/2019 | Khandani |
| 2019/0159029 | A1 | 5/2019 | Li et al. |
| 2019/0222576 | A1 | 7/2019 | Borkar et al. |
| 2019/0373105 | A1 | 12/2019 | Kung et al. |
| 2020/0034831 | A1 | 1/2020 | Blatt et al. |
| 2020/0125713 | A1 | 4/2020 | Davis et al. |
| 2020/0145823 | A1 | 5/2020 | Nair |
| 2020/0153844 | A1 | 5/2020 | Tang et al. |
| 2020/0184979 | A1 | 6/2020 | Keret et al. |
| 2020/0250290 | A1 | 8/2020 | Keret et al. |
| 2020/0389552 | A1 | 12/2020 | Trim et al. |
| 2021/0037136 | A1 | 2/2021 | Michaeli et al. |
| 2021/0044976 | A1 | 2/2021 | Avetisov et al. |
| 2021/0112163 | A1 | 4/2021 | Frenkel et al. |

OTHER PUBLICATIONS

CXone next-gen CX, printed on Jan. 3, 2023 https://www.nice.com/websites/cxone-next-gen-cx/.

* cited by examiner

SYSTEM AND METHOD FOR DETECTING AGENT SHARING CREDENTIALS

FIELD OF THE INVENTION

The present invention relates to the field of detecting fraudulent events, for example to a method and system for detecting the sharing of credentials by an agent.

BACKGROUND OF THE INVENTION

Agents working in an organization environment of contact and/or call centers are required to follow security protocols to keep various information items (such as e.g., client or consumer information and/or identifiers) safe, and in many cases these protocols are required by regulatory agencies and laws requiring privacy and security for personal information which may include financial and/or personal health data. Failure to demonstrate due diligence by, e.g., a contact center agent, may put businesses at risk of non-compliance, fines, and possible business shut down. As a result, organizations often spend enormous resources to mitigate non-compliance to security protocols, and yet are unable to prevent either passive or intentional abuse of the system, for example by agents who are working out of office. When poor practices around securing credentials, or in cases where work from home puts agents' secure access in proximity of unintended users, various contact center information and associated customer data may be placed at risk—and, for example, with work from home as a default option during pandemic, business are struggling to find options to secure their information environments at a scale never experienced by modern business.

One example source of risk for information leaking may result from an at-home agent sharing login credentials to split the workload with, e.g., someone who is not a company employee and whose identity is unknown, and who may accordingly gain undesirable contact center record and/or information access. Parties speaking on calls may need to identify themselves using credentials before participating in the calls. Non-employees using employee credentials to participate in calls may thus have no background checks or appropriate information security trainings and may quite possibly access sensitive information that can be exposed and leaked through incompetence or malicious intent. Activity of this sort might, in some cases, go undetected for an extended period without being at all monitored and/or identified. It is therefore desirable to offer dedicated technological solutions for detecting, mitigating and preventing such abuse of credentials, which may be potentially lethal to a given business or organization, in an effective and rapid manner.

SUMMARY OF THE INVENTION

A computerized system and method may detect potentially fraudulent events where agent access credentials are used by an unauthorized party based on calculations, comparisons, and analyses performed using recorded audio data, and perform a plurality of corrective actions based on calculated results. A computerized system including a processor or a plurality of processors, a communication interface to communicate via a communication network with one or more remote computing devices, and a memory including a data store of a plurality of data items—which may for example describe the remote computing devices and/or a plurality of interactions involving the remote computing devices—may compare a plurality of voice signatures, which may describe calls from a plurality of remote computers, to a plurality of corresponding voice models—and, if the comparison results in a mismatch, perform a plurality of corrective actions (which may include, for example, terminating one or more calls involving one or more remote computers).

Embodiments may include monitoring calls from a plurality of remote computers, establishing and/or creating voice models and/or voice signatures describing the remote computers, segmenting or indexing audio signals included in a voice signature to a plurality of subparts or subcomponents, associating voice models and/or voice signatures with identifiers or metadata fields, matching a voice signature to a plurality of voice models based on the identifiers or metadata fields, calculating a similarity score describing the matching between a voice signature and a voice model, transmitting alerts and/or notifications and/or messages to a plurality of remote computing devices based on comparison results, storing a plurality of data items in a data store, and performing authentication or authentication-related procedures and/or actions based on stored data items.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
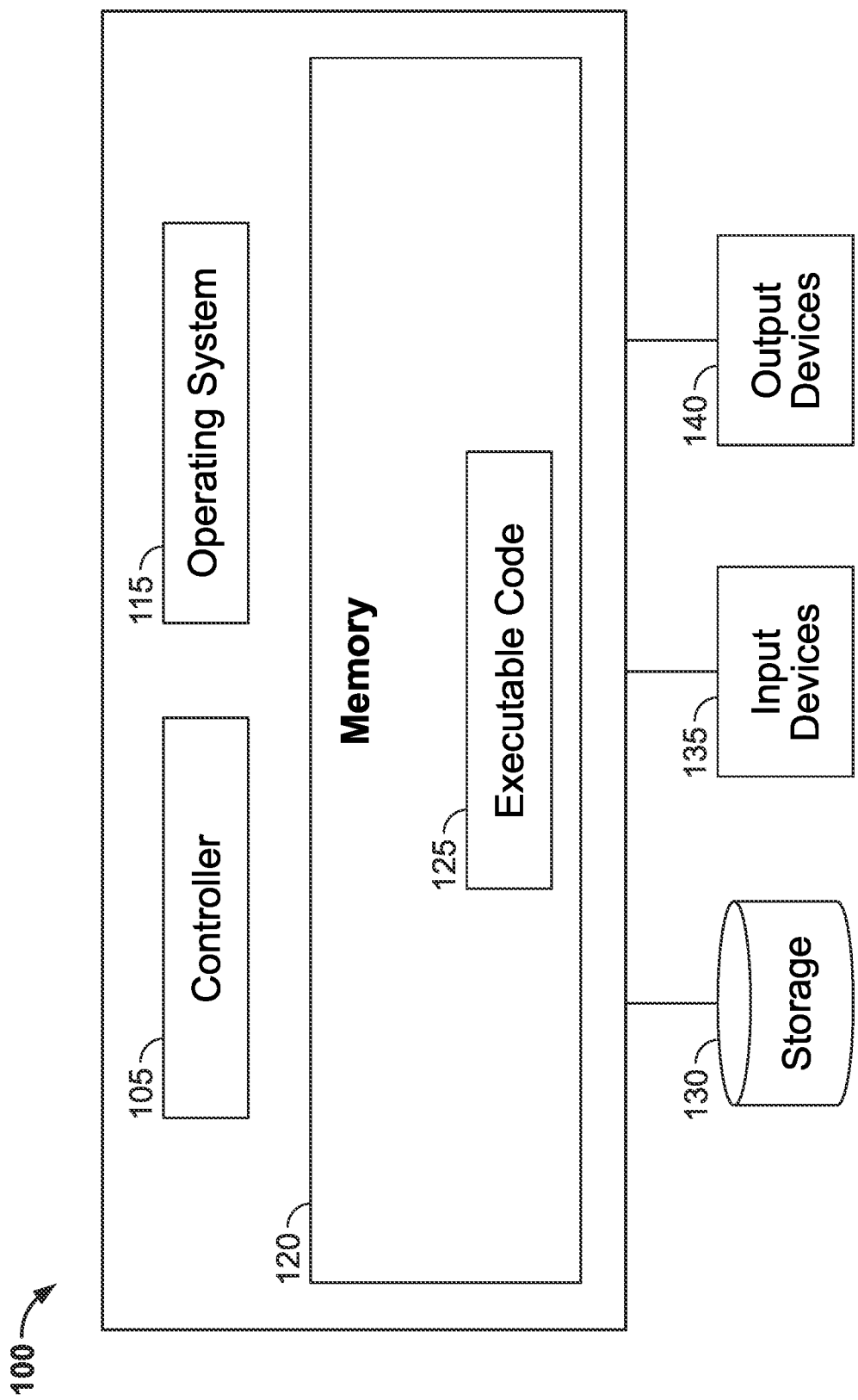
FIG. 1 is a high-level block diagram of an exemplary computing device which may be used with embodiments of the invention.

FIG. 1 shows a high-level block diagram of an exemplary computing device which may be used with embodiments of the invention. Computing device 100 may include a controller or processor 105 (or, in some embodiments, a plurality of processors) that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of the procedures and/or calculations discussed herein, and the modules and units discussed, such as for example those included in FIGS. 4-11, may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or a data store of a plurality of data items describing one or more remote computing devices as further disclosed herein.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 4-11 according to embodiments of the invention. In some embodiments, more than one computing device 100 or components of device 100 may be used for multiple functions described herein. For the various functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data describing one or more remote computing devices, as well as additional and/or different data items, may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out functions, methods and procedures as disclosed herein.

Memory or memory units 120 may include a data store of, e.g., a plurality of data items describing one or more of the remote computing devices, or data items recorded from a remote computer or a plurality of remote computers, such as further disclosed herein. It should be noted that a plurality of physically separate computer systems and/or computational resources which may or may not correspond to the architecture of system 100 (and may include for example ones provided via cloud platforms and/or services) may be for example connected via a data or communication network as a multi-memory and/or processor system, which may be used in some embodiments of the invention. Those skilled in the art may recognize that a plurality of computer system architectures may be used in different embodiments of the invention.

Embodiments of the invention may provide a method for detecting or identifying an unauthorized participant in a conversation via the use of, for example, agent sharing credentials in a computerized-system or device, and/or in a system of a plurality of remotely connected such systems or devices. For example, in a computerized system including a processor or a plurality of processors, a communication interface to communicate via a communication network with one or more remote computing devices, and a memory including a data store of a plurality of data items (see, e.g., non-limiting examples for identifiers and metadata fields, in addition to voice models, voice signatures, comparison results, and alerts and/or notifications and/or messages in the discussion herein), embodiments of the invention may be used to compare a plurality of voice signatures, which may describe calls or participants in calls from a plurality of remote computers, to a plurality of corresponding voice models—and, if the comparison results in a mismatch, perform corrective actions (which may include, for example, terminating or ending one or more calls involving one or more remote computers). A voiceprint, voice signature or voice model may describe a call by describing one participant in the call.

Embodiments of the invention may involve sending or transmitting a plurality of data items (which may for example constitute or represent audio recordings) from a plurality of remote computing devices and/or receiving or gathering such data items via for example a communication or data network, and analyzing, by a computerized system (such as example system 100) data representing the remote computers, and/or a plurality of remotely-connected computer systems.

Embodiments of the invention may include a computerized-system including for example a plurality of processors, a communication interface (such as for example a NIC) to communicate via a communication network with a plurality of remote computing devices which may be for example associated a plurality of agents, and a memory including a data store of a plurality of data items describing the plurality of remote computing devices.

In the present disclosure, a contact center will be used as a non-limiting example relating to a particular organizational structure which may utilize embodiments of the invention at hand. Those skilled in the art will recognize, however, that different embodiments may generally be used for various kinds of remotely connected computer systems, which may not necessarily be limited to computer systems operated by agents in a contact or call center environment. The contact center example in the present disclosure should thus be considered as non-limiting, and terms such as "agent" (and/or "caller", "supervisor", "customers", and the like) may be used interchangeably with uses of other computer systems among a plurality of remotely connected computer systems (or simply "remote computers") which may communicate over a data or communication network.

While agents are used herein as an example, embodiments may be used to detect sharing credentials or logins among employees or users other than agents. While embodiments may detect improper identification of a person on a call in the context of a person sharing credentials, embodiments may be used with other systems to detect one person impersonating another on, e.g., an audio stream, such as a call or interaction.

Figure 2:
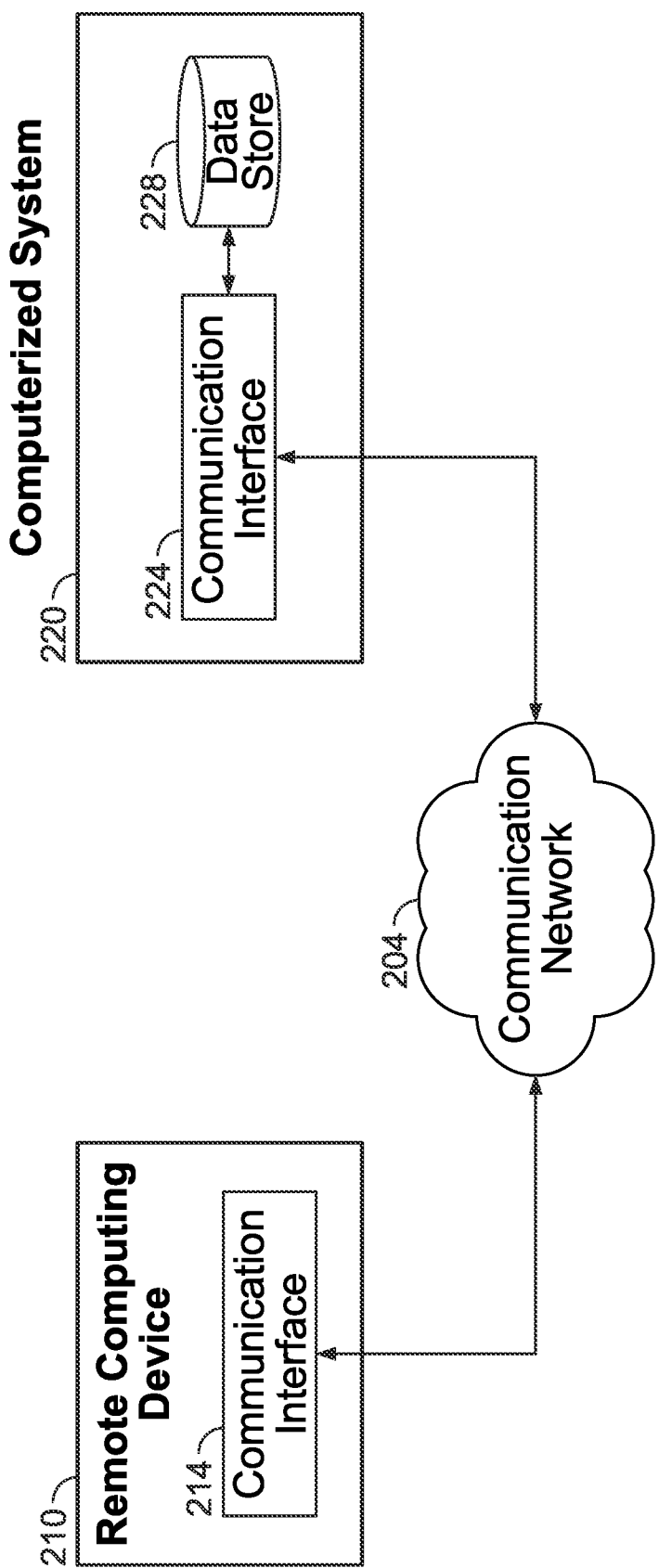
FIG. 2 illustrates a remote computer device connected via a communication or data network to a computerized system which may be used in some embodiments of the invention.

FIG. 2 illustrates a remote computer device connected via a communication or data network to a computerized system which may be used in some embodiments of the invention. Remote computer 210, may for example be operated by an agent in a contact center, Remote computer 210 may be used to conduct a call, and thus may send or transmit, over communication or data network 204, data items such as an audio stream of a call (for example audio recordings, corresponding for example to interactions or interaction segments involving one or more remote computers, which may for example be associated with a given agent or a plurality of agents) to computerized system 220, also participating in the call. Each of systems 210 and 220 may be or include system 100 or other computer systems, and include a plurality of components as further described herein. In some embodiments, computerized system 220 may additionally perform a plurality of operations including for example sending and/or transmitting and/or collecting and/or receiving data (such as for example processed data and/or calculated results) to or from additional remote computers or computerized systems (which may include for example a cloud-based database or remote services as further described herein). Those skilled in the art may recognize that additional and/or alternative remote and/or computerized systems and/or network and connectivity types may be included in different embodiments of the invention.

In some embodiments of the invention, remote computer 210 and computerized system 220 may communicate via data or communication network 204 via appropriate communication interfaces 214 and 224, respectively—which may be for example network interface controllers (NICs) or network adapters as known in the art. Computerized system 220 may include a data store 228 which may for example include a plurality of data items including, but not limited to, ones describing one or more remote computing devices and/or a plurality of interactions involving a plurality of remote computers or computing devices, e.g., as further discussed herein.

A call may be an audio interaction among two or more parties, such as a telephone call, conference call, audio portion of a video conference, or other audio session or recording; a call may also refer to a data representation of a call, such as a recording or data stream. Terms such as "call", "voice signature", "audio signal", and the like, as referred to herein may correspond to a plurality of data streams which may be recorded from a plurality of remotely connected computing devices and stored in a data store or database. Embodiments of the invention generally relate to applying various calculations and processing protocols and/or procedures to such data streams, in the context of detecting and/or preventing security threats—such as for example unauthorized accesses to a computer system and/or to computer system resources, which may be associated with potential leaking of confidential or classified data and/or information.

Some embodiments of the invention may include a cloud-based component or streaming service, or an interface to such component, which may be used to provide and/or record and/or store a plurality of audio or data streams describing or corresponding to, for example, a call or a plurality of calls involving an agent or a plurality of agents, and/or a voice signature for a given agent or a plurality of agents. A non-limiting example for such a cloud based component may be, e.g., the CXone platform by Nice Ltd. Alternative contact center platforms which may be used in this context are known in the art.

Figure 3:
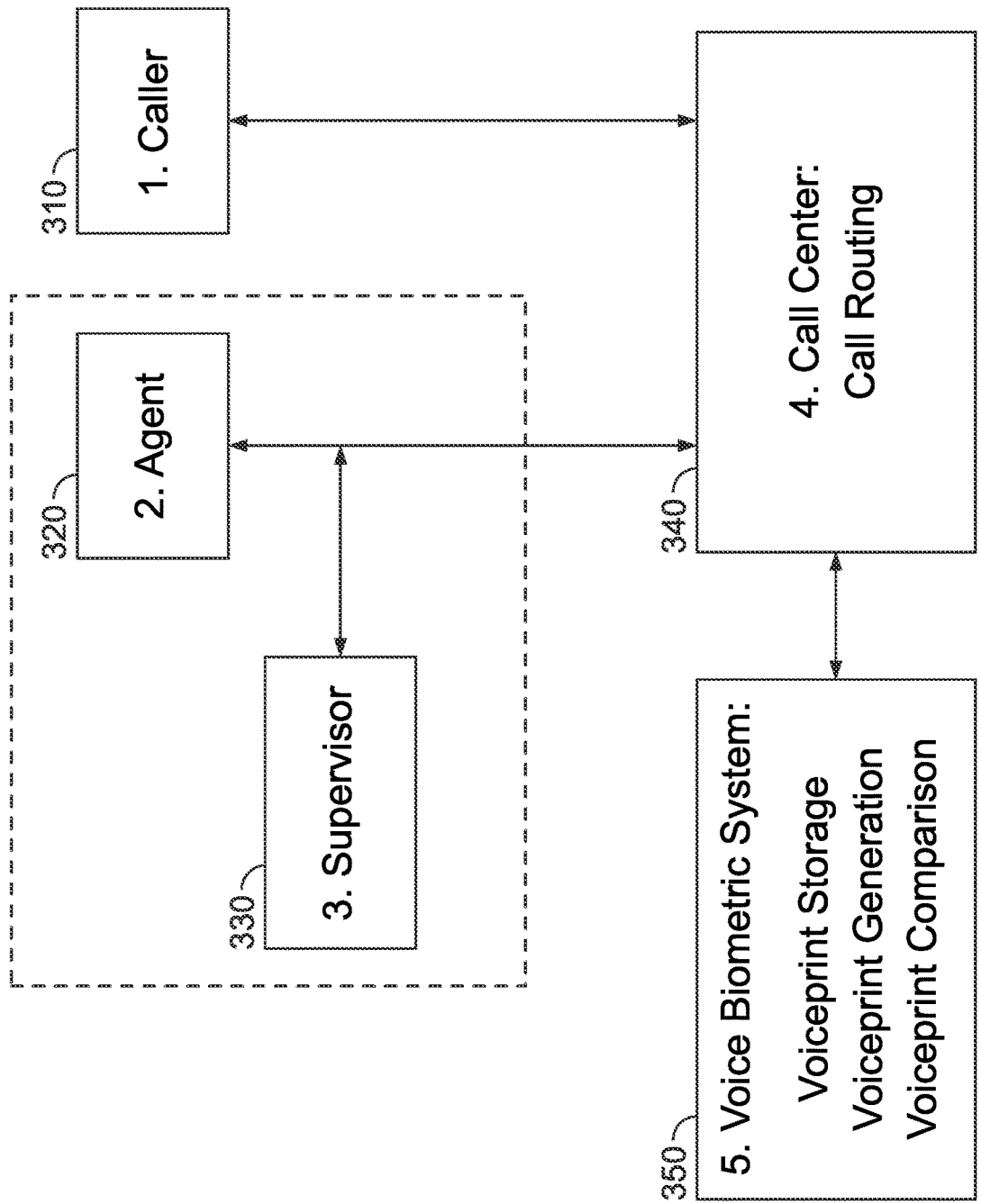
FIG. 3 is a high-level block diagram which illustrates an example interaction connectivity between different entities involved in detecting an agent sharing credentials procedures according to some embodiments of the invention.

FIG. 3 is a high-level block diagram which illustrates an example interaction connectivity between different entities involved in detecting a user or agent sharing credentials according to some embodiments of the invention. A call involving caller 310, which may be initiating or accepting the call, may be received by call center system 340, which may include various components such as for example an automatic call distribution (ACD) component, an interactive voice response (IVR) component, an audio and/or data stream recording platform, and the like—e.g., to route or connect the call to agent 320 (which may be available and/or found appropriate to service the call and/or logged into a remote computer such as for example computer 210), automatically record or collect audio and/or data streams and/or additional information from caller 310, and the like, as known in the art. In some embodiments, information collected from the caller by call center system 340 may include data items in various different data formats, which may describe or be derived from different actions made by caller 310 (including, as a non-limiting example, the pressing of buttons on a mobile device). In addition, call center system 340 may automatically generate a plurality of outputs (including, as a non-limiting examples, hold music, IVR messages, and the like) which may for example be provided to caller 310 or agent 320.

Call center system 340 may collect any input from agent 320, including, for example, audio streams, authentication and login information, and the like. Call center system 340 may similarly provide audio streams received from caller 310 to agent 320, in addition to available stored information describing a plurality of calls, a plurality of callers such as for example caller 310, as well as to notifications and alerts (to be displayed, for example, on a display screen of a computer system operated by agent 320, such as remote computer 210).

Embodiments of the invention may include a voice biometric system 350 which may be partly or fully responsible for performing agent authentication as further described herein. Voice biometric system 350 may include a data store to store, for example, a plurality of voice signatures (such as, e.g., voiceprints) and agent voice models as further described herein. Voice biometric system 350 may also include a voice signature maker module to create or generate a voice signature from a user speaking, e.g., the agent logged onto a remote computer and handling the call, and a voice signature comparer module to compare or validate the stored voice signature against the agent voice model, which may include for example calculating a similarity score and applying a predefined threshold or a plurality of thresholds to the calculated score. Some embodiments of the invention may include additional or alternative modules and components connected to or included in call center system 340 and/or to voice biometric system 350. In some embodiments of the invention, voice biometric system 350 and call center system 340 may be actualized and/or executed by a single computerized system (such as e.g., system 220). In other embodiments, voice biometric system 350 and call center system 340 may be actualized and/or executed by multiple, physically separate (e.g., remote) computerized systems. While in the examples herein voice signatures may be data captured from call participants, such as for example agent 320, which are compared to pre-stored voice models, voice models may be in the same format as voice signatures and voiceprints, and may be the same type of data. Thus a voice model may be a voice signature captured and stored for use as a future voice model against future captured voiceprints. A voiceprint, voice signature or voice model may describe or identify a person in that it may identify that person's speaking voice.

In some embodiments, voice biometric system 350 may receive identifying information describing agent 320 (such as, e.g., agent login credentials or agent ID upon a corresponding login by agent 320 to a remote computer, or data describing a login by agent 320 onto a remote computer) and/or caller 310 from call center system 340—in addition to a plurality of data streams associated with a given call (and describing, for example, voice input by agent 320 and/or caller 310). In addition, voice biometric system 350 may send or transmit an "agent validated" or "fraudulent agent detected" messages and/or notifications and/or alerts to call center system 340, e.g., as further described herein.

In some embodiments of the invention, data streams (such as, e.g., audio streams or signals corresponding to a call between caller 310 and agent 320) may be sent or transmitted by call center system 340 and received by voice biometric system 350 in real time, for example starting from the beginning of the call and through a predetermined duration, or timeframe that may be sufficient for generating an accurate and/or reliable voice signature. In some embodiments, voice signature duration may for example be set or determined as the total duration of the call. In some other embodiments, it may be determined according to the overall speech duration by the relevant agent or agents. This may be achieved, for example, by requiring an x-second long (such as for example x=5 seconds) recorded audio signal originating from the remote computer operated by the relevant agent. Alternative standards and/or criteria (relating, for example, to desirable voice signature-model comparison accuracy and robustness considerations) for determining voice signature length or duration may also be used in other embodiments of the invention.

Voice biometric system 350 may communicate and/or send notifications to call center system 340, for example to indicate the result of a comparison procedure or to request the execution of a plurality of corrective actions as further described herein.

Embodiments of the invention may automatically send or transmit alerts and/or notifications and/or messages to a remote computer or computing device separate from, e.g., system 220, which may be used for executing the modules and/or functions discussed herein. For example, call center system 340 may additionally provide or transmit alerts and/or notifications and/or messages to supervisor 330, who may, in some embodiments, optionally connect to any ongoing interaction, for example between agent 320 and caller 310. In a case where supervisor 330 chooses to connect to such interaction, call center system 340 may pass audio data streams from agent 320 and caller 310—in addition to additional information and/or metadata describing, for example, call participants (such as e.g., caller 310 and agent 320) and a plurality of present and/or historical call information—to a computing device operated by or associated with supervisor 330. Alerts, notifications, data and/or information may, for example, be displayed on an output device such as a computer screen of the computing device operated by supervisor 330. In some embodiments, the computer screen display of agent 320 may be shared or transmitted to supervisor 330. Supervisor 330 may also send notifications and/or messages and/or alerts to agent 320, and vice versa.

In some embodiments of the invention, call center system 340 may be configured to receive instructions from a remote computing device which may for example be operated by supervisor 330. For example, supervisor 330 may instruct call center system 340 to disconnect caller 310 from agent 320 in an ongoing call between the two, and to re-route the call such that caller 310 is connected to an agent different from agent 320, or to supervisor 330—or such that the call by caller 310 is put on hold or in a waiting queue. In a similar manner, supervisor 330 may block agent 320 from connecting to call center system 340, and/or to invalidate login credentials used by agent 320, or by a plurality of agents.

Figure 4:
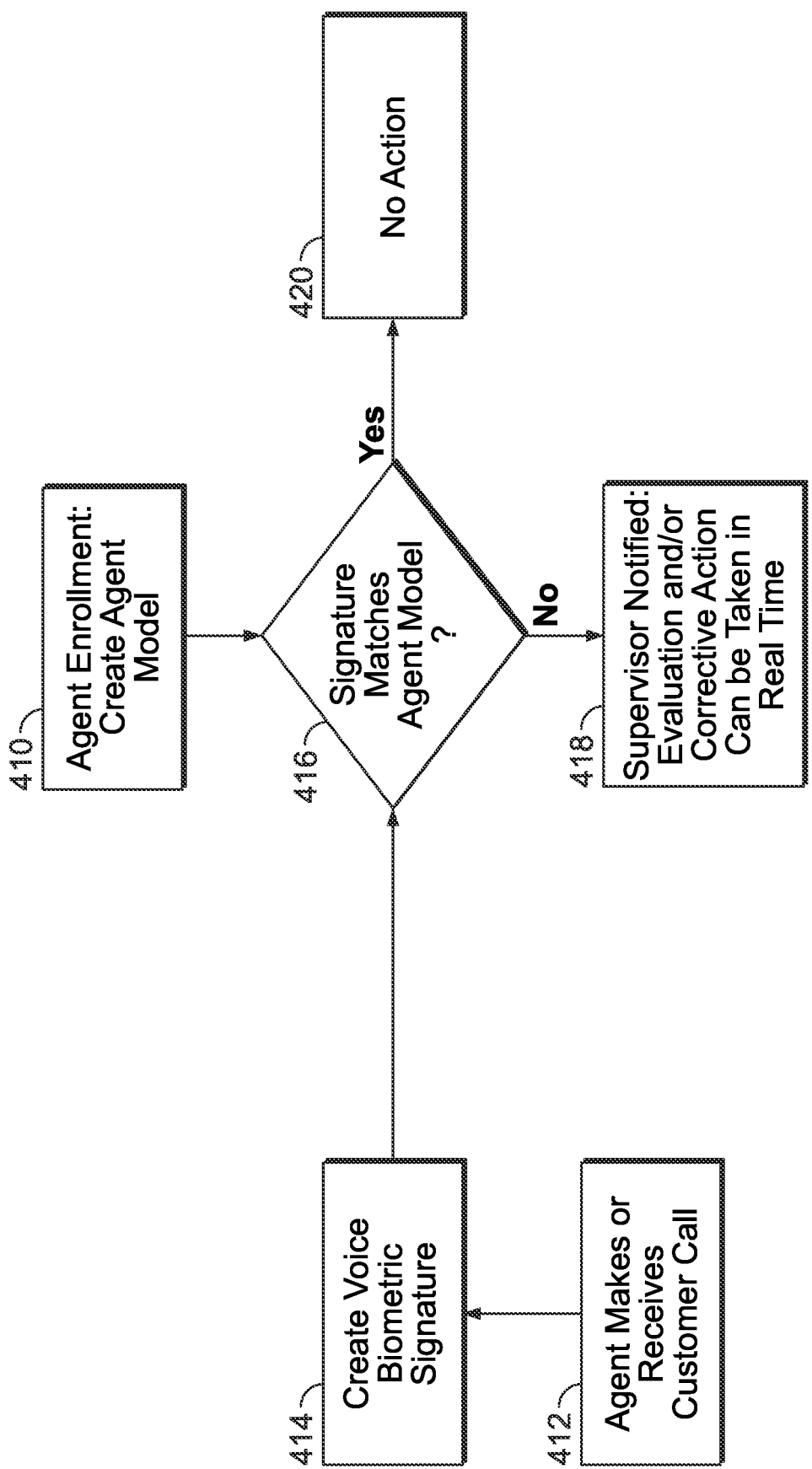
FIG. 4 is a flow diagram of a generalized example procedure for detecting agent sharing credentials according to some embodiments of the invention.

FIG. 4 is a flow diagram of a generalized example procedure for detecting agent sharing credentials according to some embodiments of the invention.

Embodiments may include establishing or constructing a plurality of voice models, each model describing an agent or a plurality of agents, which may be used for identification and authorization purposes. For example, a given agent (such as for example agent 320) may be required to undergo an agent enrollment procedure (element 410)—which may include establishing or constructing an agent voice model, for example, based on a few minutes of speech by the agent, e.g., in a voice call (which may include for example a plurality of stereo or mono channels that were separated by diarization solutions as known in the art, and may contain audio features that allow to uniquely identify the speaker with high accuracy). In some embodiments, voice models may be established or constructed based on a plurality of voice signatures created for that agent by, for example, voice biometric system 350.

Agent voice models may be organized and stored in various formats. For example, in some embodiments of the invention, voice models may be organized as a binary file (such as for example an .spk file). In some embodiments, a plurality of voice models may be described and/or sorted in a database, such as for example a structured query language (SQL) database (which may be, e.g., included in data store 228, or in a different data store). In such manner, each of a plurality of agent voice models, which may accordingly describe, for example, one or more agents in a contact center, may be associated or linked with a plurality of metadata fields or identifiers unique to a given agent and/or to a plurality of agents, and/or to a plurality of interactions. Fields in an agent voice model database may include, for example, a path for the voice model file (which may be, e.g., an .spk file), an agent ID or agent login credentials or identifiers corresponding to the agent for which the model was created, date of model or voice signature creation, renewal/update requirement or flag, organizational metadata and/or information (which may relate for example to a working team to which the agent belongs, an agent's supervisor, agent skills and/or position, etc.) and the like. One skilled in the art may recognize that different data and sorting formats may be used in different embodiments of the invention.

"Metadata field" or "identifier" as used herein may generally refer to any tag, field, or identifier (which may be for example be included as an entry in a database) that may indicate a plurality of features of a given model or signature (such as for example being outdated), or that may allow matching or correlating, for example, a voice signature to a corresponding voice model (e.g., in order to compare them to one another as further explained herein). In particular, embodiments of the invention may match voice models and signatures based on agent identifiers and/or login credentials linked to models and signatures.

A given agent, for which a voice model has been constructed or established, may make or receive a call or a plurality of calls which may be monitored by embodiments of the invention. Such call may, for example, involve (e.g., include as a participant) a client or customer (element 412). In some embodiments, the agent handling or participating in a call may first be required to log onto a remote computer by using appropriate login credentials (e.g., associated with a given enrolled agent—where it is assumed that the agent's identity was non-fraudulent upon enrollment).

Embodiments of the invention may create or generate a voice biometric signature for the agent being involved in a call (element 414), for example upon detection of the use of login credentials associated with a given agent and/or based on the logging of an agent onto a remote computer (such as, e.g., upon the receiving of login data or metadata from a remote computer as further described herein) according to some embodiments of the invention. More generally, embodiments may create a plurality of voice signatures, such as voiceprints, describing a plurality of calls from a plurality of remote computers. For example, whenever agent authentication is required (either in real-time during a new call, post-call, or as a sign-on requirement), a voice biometric signature or voiceprint may be created using at least a few seconds of recorded speech by the agent. Some embodiments of the invention may request the agent to speak and record the agent in order to create a voice signature independently of any call in which the agent may be involved (e.g., once a use of that agent's login credentials for logging into a remote computer has been detected by embodiments of the invention—such as based on the automatic receiving of login credentials and/or related information by embodiments of the invention). Thus, in some embodiments, a voiceprint for a given agent may be created at the very beginning of either an inbound or an outbound call (for example based on the agent logging into call center system 340 in order to handle the call), which may provide the system with sufficient time to take corrective actions as further described herein.

In some embodiments, voice signature generation or creation may involve or correspond to, for example, sending or transmitting a plurality of audio data streams corresponding to a few seconds of speech (such as for example 5 seconds) by a given agent from call center system 340 to voice biometric system 350, segmenting or indexing the received data streams by voice biometric system 350, and storing and/or documenting a voice signature in a data store and/or database as further described herein. Other methods of generating a voice signature may be used, however, in different embodiments of the invention.

In some embodiments, generated or created voice signatures may be associated with or linked to a plurality of metadata fields such as for example an agent ID of a plurality of IDs, date and time of creation, and the like (e.g., additional or alternative fields which may be used to link a signature with a given agent's login credentials), and may be stored in a system's memory (such as for example data store 228 and/or a different, separate data store or database) for future use (e.g., for model-signature comparison, and/or for purposes not limited to immediate authentication concerning a call an agent is currently involved in, e.g. speaking on).

Embodiments of the invention may recognize participants, such as for example an agent, in a call and accordingly create a voice signature for a given agent (e.g., based on the logging of that agent into a remote computer as described herein) and/or match the signature with a corresponding voice model based on, e.g., metadata and/or metadata fields associated with the remote computing systems operated by the agent (such as, e.g., login credentials and/or agent ID linked with the model and signature). For example, when a given agent logs into a remote computer (e.g. enters authentication details such as an ID and password, and is given certain permissions or access) and/or when the logged-in agent takes part in a call, embodiments may detect the logging or use of login credentials associated with a given agent. This may be achieved, for example, using metadata such as e.g., agent ID or login credentials which may be transmitted from or provided (e.g., automatically, for example as a JSON object, although other formats may be used in different embodiments of the invention) by the computer operated by the agent and received by, e.g., call center system 340. In such manner, call center system 340 may identify, link, or associate the audio or call data streams resulting from the remote computer operated by the agent with the agent's ID or login credentials used for login. In such manner, embodiments may recognize a given speaker as an agent (for example based on the fact that a received agent ID reflects a login action employing that agent's credentials), and/or a voice recording as relating to a particular remote computer (for example to which an agent was logged in). Embodiments may thus determine or detect if a call may include or involve a fraudulent agent, or an improper use of agent login credentials, based on voice signature—voice model comparison as further described herein.

In the case where a call or interaction involving the agent is recorded using multiple channels (such as, e.g., stereo recording), the channel or audio stream being recorded from a remote computer may be linked with the agent ID or login credentials received as a result of a login action on that remote computer, and/or additional with metadata, e.g., by a streaming service or component such as the CXone platform mentioned herein. Alternatively, in the case of a monaural (mono) recording, where a plurality of voices may be present in a single channel or audio stream, diarization and/or voice-activity-detection procedures may be used to segment or index the recording, e.g., according to parts in which an identified agent's voice is recognized. In this context, different diarization procedures, which may for example be based on models trained on appropriate audio data, are known in the art and may be used for such purpose.

The voice signature for agent 320 may be compared to or validated against the agent voice model for the agent under consideration (e.g., based on the login credentials associated or linked to the signature and model in appropriate databases, and a corresponding matching of the model and signature as described herein), and embodiments may check if the signature is similar to or resembling the corresponding model (element 416).

In some embodiments, signature-model comparison or validation may include matching or correlating a voice signature with a voice model or with a plurality of voice models based on matching a plurality of identifiers or metadata fields, such as for example agent login credentials associated or linked with the voice signature, with a plurality of identifiers associated with the corresponding voice model or plurality of models (such as e.g., similar or identical login credentials associated or linked with the models; although alternative fields and/or sources of information may be used in different embodiments of the invention). In such manner, embodiments of the invention may determine which pre-stored voice models are to be compared to or validated against a given voice signature based on, e.g., login credentials linked with a plurality of voice signatures and models. For example, matching or correlating a voice signature with a voice model may involve searching a voice model database, such as, e.g., the voice model database considered herein, for the path to the stored speaker model matching one or more metadata fields (such as for example an agent ID or login credentials) associated with the newly created voice signature. Such search may involve or require, in some embodiments, a plurality of application programming interface (API) calls to appropriate platforms or programs (such as for example an appropriate Nexidia Engine, and/or additional analytics platforms which may be used, e.g., as part of diarization and/or voice-activity-detection procedures as known in the art—although alternatives platforms and/or applications may be used in different embodiments of the invention) which may provide additional inputs characterizing the voice signature data stream and the corresponding stored voice model.

A matching procedure may be based on the unique metadata field (such as for example an agent ID or login credentials and/or alternative identifiers or metadata fields which may be queried in an SQL database by embodiments of the invention) linked or associated with both the agent voice model and, for example, the remote computer associated with the agent which may be involved in or speaking on a particular call (such as for example an agent or call ID). When authentication is required, for example in the beginning of a call, one or more metadata fields for, e.g., a newly-created voice signature may be used to query, lookup or search a plurality of voice models matching or associated with that metadata field, which may be chosen as candidates for further comparison by embodiments of the invention. In such manner, a voice signature may quickly be compared (e.g., in real time) to or validated against a particular voice model or a plurality of models, e.g., based on the metadata fields associated or linked with both the model and the signature.

For example, in case agent X uses login credentials from a remote computer, embodiments of the invention may first identify that remote computer with agent X or detect a logging by agent X onto a given remote computer, e.g., based on an agent ID included or associated with the agent's login credentials used, e.g., agent_id=X (for convenience, an identified such remote computer may be referred to as computer X)—which may be, e.g., automatically sent from the remote computer and received by call center system 340 and/or alternative components included in embodiments of the invention. Voice models and signatures created or generated using calls involving computer X may accordingly include or be associated with information describing an agent's login credentials, such as for example agent_id=X (which may be reflected in metadata fields included in appropriate databases as described herein). When agent X takes part in a call, then embodiments may create a voice signature from, e.g., audio data from the call involving computer X as described herein, and store it in system's memory (such as for example in data store 228)—in addition to associating or linking the newly-created signature with agent_id=X (for example as a metadata field in an appropriate voice signature database). For a newly-stored voice signature, embodiments may first check whether a voice model associated or linked with agent_id=X exists in the system (for example by querying a voice model database for agent_id=X). If such model is found (a voice model database may, e.g., indicate that such voice model is stored, e.g., in data store 228), embodiments may then match the voice signature to the voice model based on their common agent_id=X value, and perform a signature-model comparison as described herein. In case such model is not found in system's memory, embodiments may for example send an alert to a remote computer (which may be for example operated by a supervisor) and indicate that a voice model should be established for agent_id=X, or begin establishing such voice model automatically, for example based on audio data describing the call, and/or using additional, past or future calls and corresponding audio data. As noted herein, if the signature-model comparison results in a mismatch (indicating a potentially-fraudulent use of login credentials), embodiments may perform corrective actions, while if the comparison results in a match—embodiments may, for example, allow the call to continue without interruption.

In other embodiments, the comparison procedure may involve comparing the newly-generated voice biometric signature to all agent speaker models stored in the system (e.g., system 100 and/or data store 228). The comparison procedure may thus result in a mismatch if the voice signature is found not to match any of the existing models, e.g., for all contact center agents.

Embodiments may compare and/or measure and/or quantify the similarity between a voice signature and a voice model by calculating a matching or similarity score. As part of such comparison procedure, embodiments may encode or represent the relevant voice signature and voice model as vectors. In such manner, a plurality of features and attributes of the signature and model may be converted or mapped into corresponding vector fields. In some embodiments, vector representations or "embeddings" of voice signatures and models may be generated using an appropriate vector embedding model, which may, e.g., include or involve one or more neural networks. Various appropriate embedding generation procedures may be used in different embodiments and may include or involve, for example, 512- and/or 1024-dimensional x-vectors generated by a deep neural network (DNN), which are used in the art to discriminate between different speakers—although additional or alternative procedures may be used as part of vector embedding or representation generation in different embodiments of the invention. In some embodiments, the similarity score may be calculated, for example, as a distance between a plurality of generated embedding or vector fields describing the signature and model according to the cosine distance or similarity formula:

$$sim(S_1, S_2) = \frac{S_1 \cdot S_2}{\|S_1\| \cdot \|S_2\|} \quad \text{(eq. 1)}$$

where $S_1$ is the set of values in a plurality of fields included in a vector embedding describing the voice signature, and $S_2$ is set of values in respective plurality of fields included in an embedding describing the voice model. It should be noted that other formulas and procedures for measuring similarity between voice signatures and models may be used in different embodiments of the invention.

In order to determine if a given comparison procedure results in a match (e.g. a voiceprint and a corresponding voice model both identify the same person) or mismatch (e.g. a voiceprint and a corresponding voice model do not identify the same person), embodiments may compare or apply one or more thresholds (which may be, for example, predetermined and/or user defined) to calculated similarity scores. For example, a threshold may be a single number, which may be customized or adjusted (e.g., found suitable for a particular deployment or application) to reflect a tradeoff between precision and security measures. Thus, in some embodiments, a given comparison procedure may result in a match if the calculated similarity score exceeds a predetermined threshold $T_1$ (such as for example $T_1=0.7$). Additionally or alternatively, a given comparison procedure may result in a mismatch if the calculated similarity score is below a predetermined threshold $T_2$ (such as for example $T_2=0.6$). In some embodiments, if the comparison does not result in either a match or a mismatch, additional corrective actions may be performed. For example, if the calculated similarity score is found between $T_1$ and $T_2$, embodiments may request the corresponding agent (such as for example agent 320) to record a new voice signature, and then perform one or more comparison procedures as described herein. Such process may be repeated or performed in an iterative manner, e.g., until a match or mismatch is determined. One skilled in the art may recognize that different thresholds (such as for example dynamic thresholds that may be automatically modified depending on the number of iterations performed) and corresponding procedures and/or corrective actions may be used in different embodiments of the invention.

Comparison or validation result or output may return or may be a similarity score and/or binary "match"/"mismatch" (or "validation successful/unsuccessful") values (e.g., 1 and 0, respectively)—and may for example be stored or documented in a database or data store (such as e.g., data store 228, or a separate, different data store) and be associated with or linked to a plurality of metadata fields associated with the corresponding agent(s) or interaction (such as, e.g., agent and/or interaction ID, agent login credentials, data and time, agent skill, interactions labels such as for example "complaint", "customer support", "inquiry", and the like). Stored scores may be further analyzed or processed for further use—such as, e.g., for calculating statistics describing a plurality of signature-models comparison, which may indicate a need for re-generating or re-creating voice signatures (for example in case where an average similarity score is below a corresponding predetermined threshold), or a need for manually monitoring future calls by a given agent. Other processing actions may be performed on a plurality of stored similarity scores by different embodiments of the invention.

If a given signature-model comparison or validation procedure results in a mismatch (e.g., in case of an unsuccessful validation), embodiments may take a plurality of corrective actions. In some embodiments, corrective actions may include, for example, providing or sending a notification to a supervisor in real time (element 418), and/or automatically terminating or ending the call (e.g. the call from which the voiceprint is generated) or a plurality of calls involving the agent, and/or automatically disconnecting the call from the agent that has not passed authentication, and/or automatically transmitting an alert to a computing device which may be remote and/or physically separate from computerized system 220. In the case where the agent voice does, in fact, match the corresponding agent voice model, embodiments of the invention may take no corrective action and allow the call to proceed without intervention (element 420).

In some embodiments, corrective actions such as for example alerts and/or notifications sent to a remote computer, and/or messages describing a corrective action taken (e.g., indicating the termination of a call) may be stored and/or documented in a database or data store (for example within data store 228, or a different, separate data store) and associated with relevant and/or additional metadata fields (such as for example a call ID describing the call in which the relevant authentication procedure was performed). The relevant voice signature entry in a corresponding database may accordingly be updated, which may include, for example, associating the database entry with a plurality of corresponding metadata fields, and/or linking the entry to the relevant agent model which was used in the comparison procedure. Alternative schemes for storing and/or linking voice model and/or voice signature database entries may be used in different embodiments of the invention.

Figure 5:
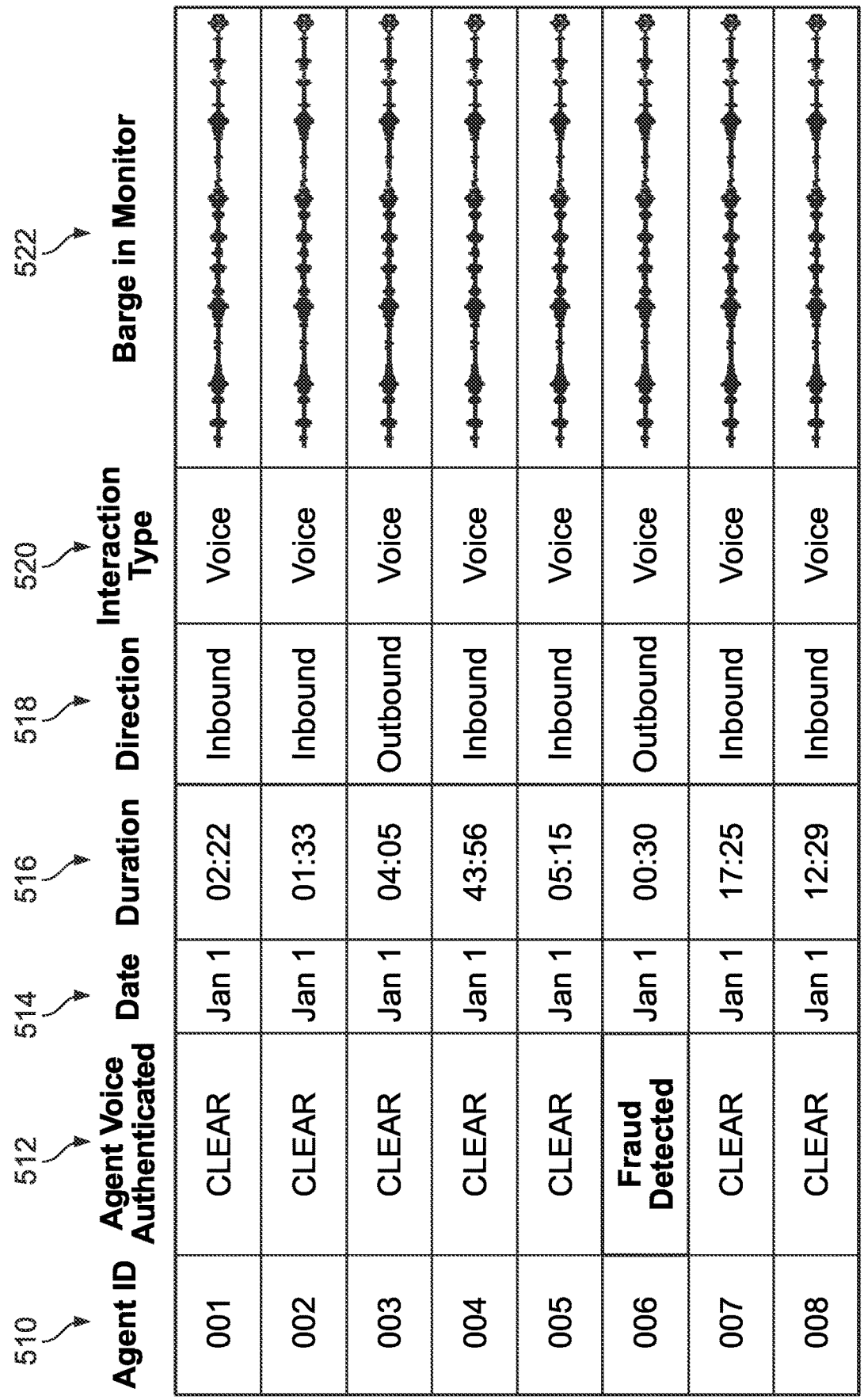
FIG. 5 shows an example fraud monitoring dashboard which may be used in some embodiments of the invention.

FIG. 5 shows an example fraud monitoring dashboard which may be used in some embodiments of the invention (for example, by a supervisor, in accordance with the contents of the present disclosure). A plurality of agents may be described and sorted according to an identifier such as for example agent ID 510 (which may also be used for authentication purposes). Interactions associated with the agents may be categorized as "clear" (e.g., as successfully authenticated) or as "fraud detected" (e.g., indicating that authentication has failed for the interaction at hand) in an appropriate "agent voice authenticated" field 512 within the dashboard. Additional variables such as for example interaction or call date 514, duration 516, direction 518 (such as, e.g., inbound or outbound), type 520 (such as for example "voice", "chat", "video", etc.), and the like, may also be described and/or indicated.

In some embodiments of the invention, a "barge in" monitor 522 may be included in the monitoring dashboard, which may allow monitoring, and/or receiving information and/or notifications or alerts on whether and/or when a given call or interaction has been interrupted and/or intercepted and/or paused (e.g., put on hold) and/or terminated, in accordance with the contents of the present disclosure. Such information may, for example, be implemented in appropriate coloring on a visual representation of, for example, the call's audio stream. Alternative monitoring schemes and representations may be used in other embodiments of the invention.

Figure 6:
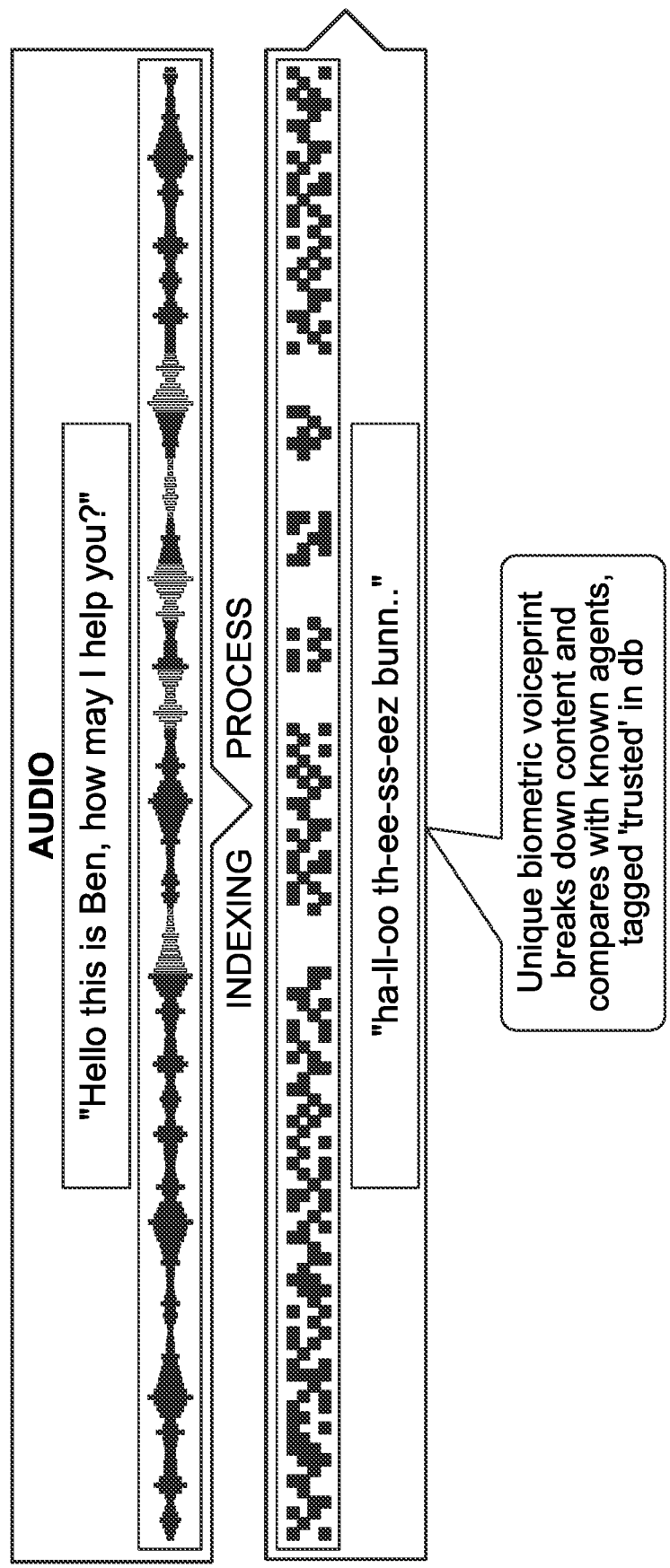
FIG. 6 illustrates an example process of creating a biometric voiceprint according to some embodiments of the invention.

FIG. 6 illustrates an example process of creating or generating a biometric voiceprint according to some embodiments of the invention. Upon the receiving of an audio signal, embodiments may index and/or segment the signal into a plurality of audio subparts or subcomponents which may, for example, be compared with an agent voice model or a plurality of models. In some embodiments, indexing and/or segmentation may be performed based on spoken vowels and/or consonants and/or syllables, which may be identified within the audio signal, for example based on appropriate detection algorithms or procedures as known in the art. Indexed subparts may accordingly be compared to an agent voice model or a plurality of models, which may, in some embodiments, include a plurality of stored recordings of corresponding vowels and/or consonants and/or syllables by a given agent and/or a plurality of agents. In such manner, embodiments may compare the indexed subparts of a newly-created voice signature with corresponding reference recordings within a given agent voice model, for example to calculate a "match" or "mismatch" value as further described herein.

Figure 7:
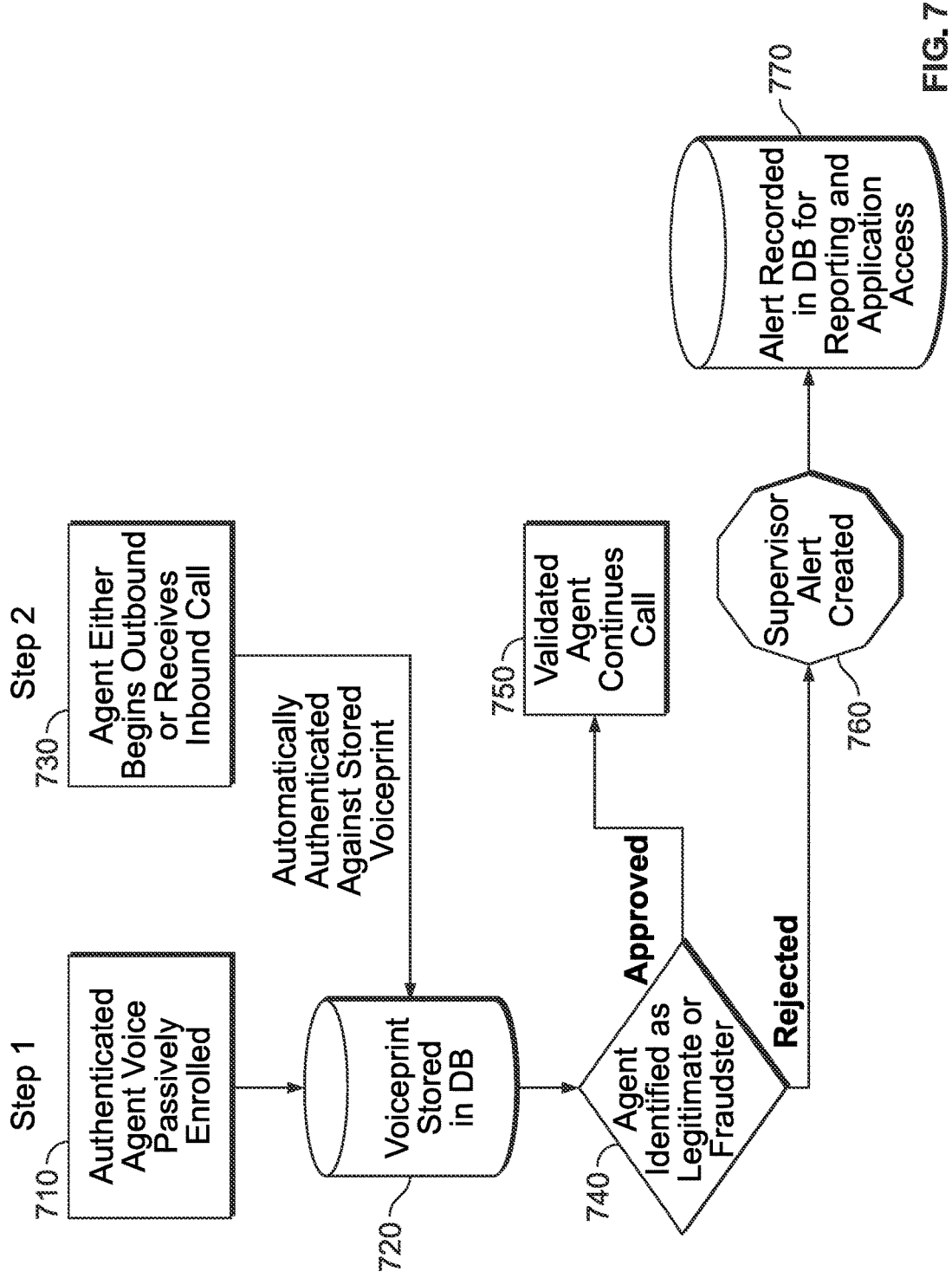
FIG. 7 is a high-level flow diagram of an example data flow in a procedure for detecting agent sharing credentials according to some embodiments of the invention.

FIG. 7 is a high-level flow diagram of an example data flow in a procedure for detecting agent sharing credentials according to some embodiments of the invention (e.g., in accordance with the contents of FIG. 4 and the corresponding discussion herein). In some embodiments, authenticated agents agent may enroll into voice biometric system 350 by first providing data and/or information items to establish or construct a plurality of corresponding agent voice models (element 710). The voice models may then be stored in system's memory (which may for example be data store 228 in computerized system 220; element 720) and documented or described using entries or metadata fields in a database (such as, e.g., a voice model database as described herein). When a user participates in a call (e.g., an enrolled agent begins an outbound call or receives an inbound call) (element 720), embodiments may receive the audio signal associated with the call and, for example, create or generate a voice signature to authenticate the agent under consideration in accordance with the contents of the present disclosure. Thus, data representing the call and/or signature may accordingly be stored in system's memory and documented or described using entries or metadata fields in a database, which may be the same database used to describe agent voice models, or a different, separate database (element 720).

Embodiments may then identify the agent taking part in the call as, e.g., "legitimate", or as "fraudster" (element 740)—for example by comparing the stored voice signature to a stored voice model. If the agent is "approved" (e.g., identified as "legitimate" according to a successful validation procedure), embodiments may not take any corrective action or intervene with the call, and the validated agent may continue the call without interruption (element 750). In case, however, the agent is "rejected" (e.g., identified as "fraudster" according to an unsuccessful validation procedure), embodiments may create and/or send and/or transmit an alert or notification to a supervisor as discussed herein (element 760), and record or store the alert in system's memory (which may, e.g., be data store 228 or a separate, different data store; element 770)—which may for example be used and/or accessed by various computer programs and/or applications (such as for example ones included in call center system 340, and/or ones used for the reporting of alerts, and/or various analytics platforms and/or applications such as described herein).

In some embodiments of the invention, alerts may include, for example, a text file or string, or a JSON data object or item, which may be sent to a remote computer (which may be for example operated by a supervisor) via communication or data network 204. In some embodiments, an alert may for example contain or include a plurality of fields, which may themselves include, e.g., different characteristics and/or attributes of voice signatures, models, or signature-model comparisons (including, but not limited to, time stamps describing the creating, establishing, or comparing of signatures or models, as well as calculated similarity scores for past signature-model comparisons). An alert may be received and displayed by a remote computer (e.g., using a GUI) based on parsing information which may, for example, be included in the alert. In such manner, large alert files, containing a large amount of data and/or information, may be displayed by a remote computer in a manner intelligible and/or comprehensible to a human user (for example—to include a "barge in" monitor, where visual representations of audio data are labeled, as depicted in FIG. 5). Alternative alert data formats and contents may be used in different embodiments of the invention.

In some embodiments, a plurality of actions and/or procedures which may, e.g., be associated with call monitoring, voice signature creation, biometric data analysis, signature-model comparison, and alert generation and transmission may be performed using a dedicated real-time authentication (RTA) engine—which may, for example, include a plurality of additional authentication-related components as known in the art and be executed by computer system 220 and/or call center system 340 and/or voice biometric system 350, and/or different combinations of these systems (as noted herein, such systems may be physically combined or separate according to different embodiments of the invention).

Actions and procedures associated with call monitoring, voice signature creation, biometric data analysis, signature-model comparison, and alert generation and transmission, may, in some embodiments, be performed based on data items documented or stored in a data store and/or database (such as for example based on identifiers or metadata fields, and/or on alerts and/or notifications and/or messages). For example, if a predetermined number of signature-model comparisons for a given agent have resulted in a mismatch within a given period of time, such statistic may be documented in an appropriate metadata field in a corresponding database (which may be for example an SQL database or other suitable database), and indicate a need for establishing a new voice model for the agent under consideration. Embodiments may then automatically request the agent (such as for example by sending an appropriate notification and/or message to a remote computing device associated with the agent) to re-establish such voice model, which may for example require them to record several minutes of speech as described herein.

In some embodiments of the invention, inbound and outbound calls may be handled differently. For example, different similarity score thresholds may be applied to the two different types of calls; a voice authentication procedure may be evoked or required before initiating a call of one of the two types, while a call of the other type may be initiated without require such prior procedure; corrective actions performed following failed authentication or comparison mismatch may differ for the two call types, and the like—depending, e.g., on various security preferences and considerations by a given call center.

Some embodiments of the invention may include a plurality of separate modules and/or computer programs and/or applications to perform different procedures and calculations as described in the present disclosure. In some embodiments, a validation application may be used to perform, for example, authentication and enrollment related procedures—while a separate, alert generation application may be used for creating and/or sending and/or transmitting alerts to a remote computer, or to a plurality of remote computers as described herein.

Figure 8:
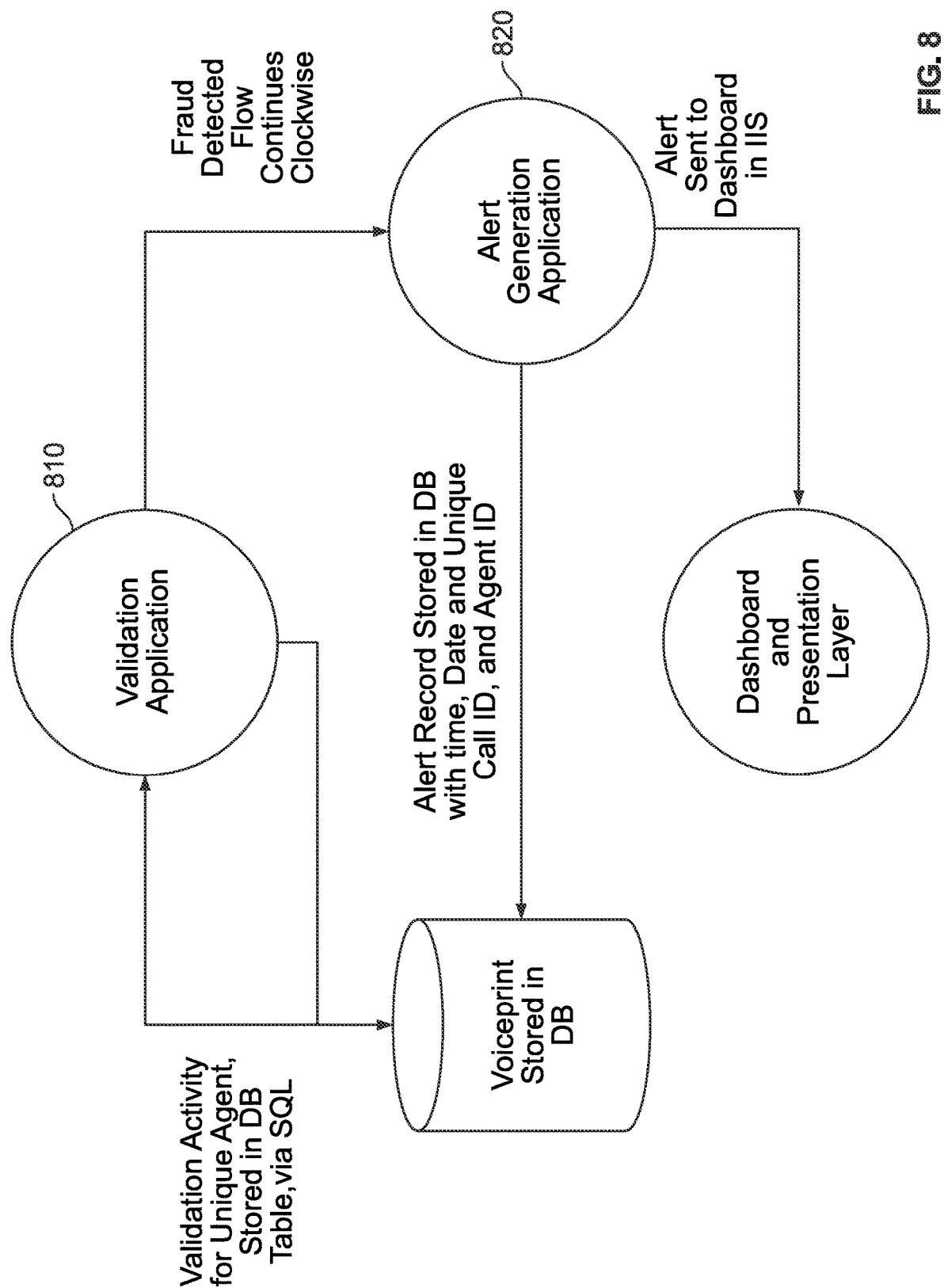
FIG. 8 is a high-level architecture including a validation application and an alert generation application which may be used as part of a system for detecting agent sharing credentials according to some embodiments of the invention.

FIG. 8 is a high-level architecture including a validation application and an alert generation application which may be used as part of a system for detecting agent sharing credentials according to some embodiments of the invention. Validation application 810 may query a database (which may be for example included in data store 228 and describe agent voice models and voice signatures) for various validation and/or authentication related procedures, including but not limited to comparing voice signatures with agent voice models and calculating similarity scores. In some embodiments, querying the database by validation application 810 (e.g., as part of comparing voice signature to agent voice models) may be performed using a plurality of SQL commands. Upon the detection of fraudulent activity (which may correspond, for example, to a mismatch between a voice signature and an agent voice model or a plurality of models), validation application 810 may notify and/or communicate with alert generation application 820, which may create or generate an alert.

Alert generation application 820 may send or transmit an alert record to a database and/or data store (which may be for example data store 228, or a different, separate data store or database), where the alert record may be stored together with appropriate metadata fields—such as for example a timestamp, date of generation, call ID, agent ID, and the like. Alert records and metadata fields may be organized and stored in various formats—such as for example a table or graph database. Different data formats may be used in different embodiments of the invention.

Following the generation of an alert by alert generation application 820, embodiments may send or transmit the alert to a presentation layer of a remote computing device (which may be operated, e.g., by a supervisor), where it may, for example, be presented or displayed on supervisor's dashboard as explained herein (see, for example, FIG. 5).

Figure 9:
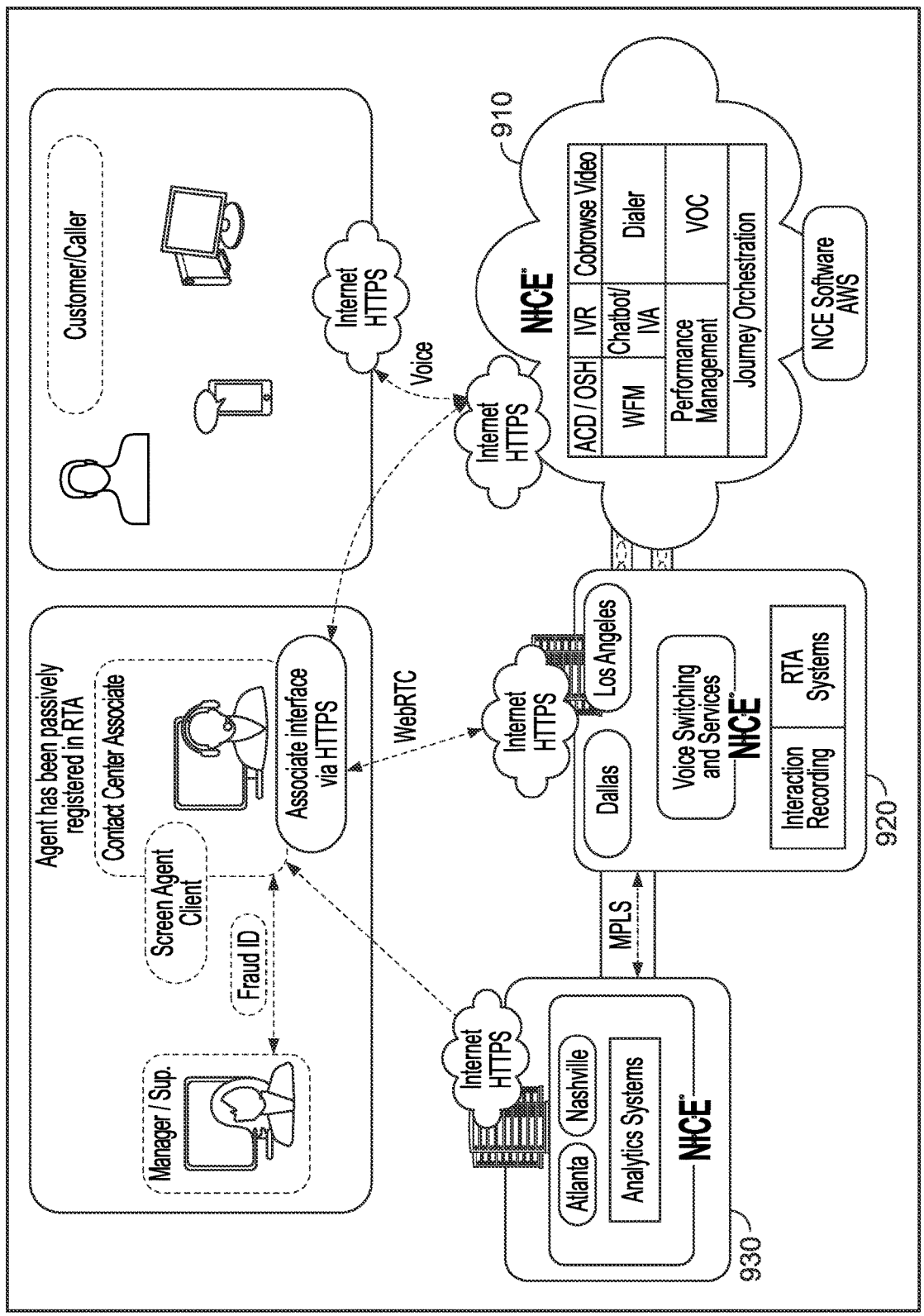
FIG. 9 illustrates an example implementation of a system for detecting agent sharing credentials according to some embodiments of the invention.

FIG. 9 illustrates an example implementation of a system for detecting agent sharing credentials according to some embodiments of the invention. The illustration considers the CXone cloud-based platform by Nice Ltd as a non-limiting example. A voice call by a customer or caller may be connected, via a communication network (for example using a secure internet communication protocol) to the Nice CXone platform 910 running on, e.g., Amazon Web Services (AWS), which may be a particular non-limiting example of a cloud-based call center system 340 and include a plurality of call center management related components and/or modules, such as an ACD and IVR applications, a workforce management (WFM) application, and the like, as known in the art. Nice CXone platform 910 may then route or transfer the call to an agent or contact center associate, which has accordingly been enrolled or registered in an appropriate RTA system (for example by creating an agent voice model as discussed herein). A supervisor may have access to voice calls involving the contact center associate, and to computer screen activity and/or information by that associate—and may accordingly monitor calls and/or interactions as described herein.

Upon the detection of a call participant not corresponding to their stated identification or other fraud (for example according to a signature-model mismatch) action may be taken such as the sending or transmitting of an appropriate notification or request from voice switching and services (VSS) platform 920 to Nice CXone platform 910, the latter may automatically route or transfer the corresponding call from the fraudulent agent or contact center associate to a different agent or associate, or automatically terminate the call at once. Additionally or alternatively, a supervisor may, for example upon receiving an alert from analytics systems 930, manually instruct Nice CXone platform 910 to route or transfer or terminate the call involving the fraudulent agent or associate. Accordingly, embodiments of the invention may perform such actions and/or procedures upon the receiving of an instruction from a remote computing device (which may for example be operated by a supervisor).

One skilled in the art may recognize that various alternative implementations, including or involving different components and/or systems and/or applications and/or communication interfaces may be considered according to different embodiments of the invention.

Some embodiments of the invention may be focused on or optimized for real time authentication purposes as discussed herein (for example, at least one of the steps of comparing voice signatures to voice models, performing corrective actions, creating of voice signatures, and automatically transmitting an alert to a remote computer or a plurality of remote computers—may be performed in real time, for example during the call in which a given agent undergoes an authentication procedure). Other embodiments may also be focused on post-call analysis, where, for example, recorded past calls may be used instead of real time data streams. In some embodiments, only parts or segments of calls may be recorded and/or stored and/or analyzed, for example in cases where it is desirable to save computational resources such as, e.g., computation and storage resources.

Previous systems and methods for detecting potentially fraudulent events may be focused on scenarios where erroneous or invalid access credentials, such as for example invalid login information, is used by a potentially fraudulent agent. Such systems and methods may not detect improper use based on valid access credentials and may not be adjusted to a "work from home" paradigm, and which might thus entail various security threats of different kinds, such as, e.g., an agent providing login credentials to an unauthorized person without permission from the organization. In such example scenario, previous systems and methods in which no voice-based authentication component is included may fail to identify fraudulent activities. In addition, previous voice-based systems and methods may offer inaccurate authentication solutions, where comparisons between a recorded voice signature and a reference recording often result in false negatives (e.g., a fraudulent agent may not be identified) or false positives (e.g., a non-fraudulent agent may mistakenly be identified as fraudulent). In such manner, security measures and standards embraced by an organization may be compromised, or, alternatively, manual labor associated with handling false security breaches may be unnecessarily costly. Embodiments of the invention may improve prior authentication and security technology by providing solutions for handling relevant security threats, in that they may offer real time and/or retroactive voice-based authentication based on statistically robust voice models and signatures, which entail fewer identification errors and may include adjustable and/or modifiable thresholds that may reflect custom security preferences chosen by a given organization. Thus, embodiments of the invention may offer security solutions that may align with call monitoring practices (e.g., by a supervisor), which may accordingly not be wasted on interactions that have not been mistakenly identified as "suspicious" based on an erroneous voice based authentication result.

Embodiments of the invention may improve the technologies of fraud prevention and user identification by automatically determining if a fraud is taking place by adding to user authentication procedures an automatic procedure such that an already authenticated user has their identity checked using an automatic and "background" voice identification process, separate from an authentication process the user initiates.

Figure 10:
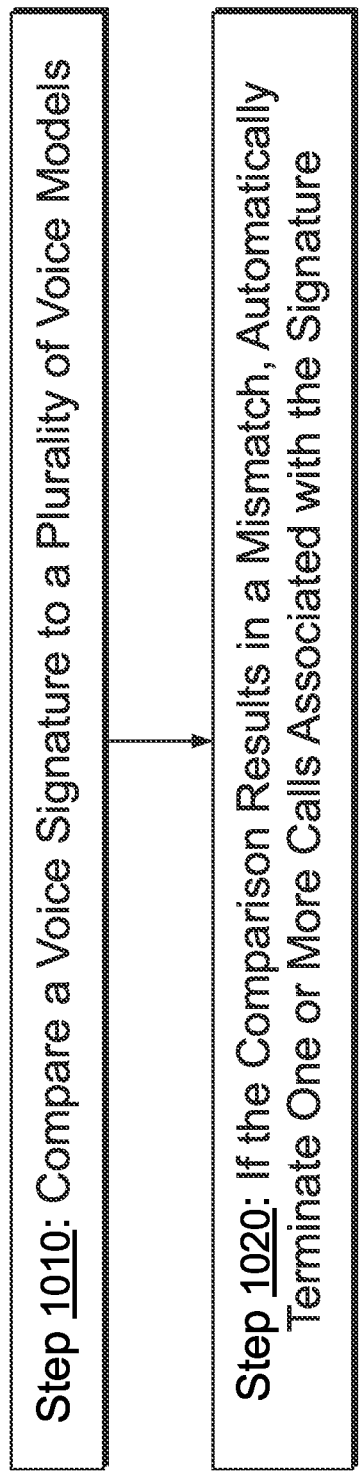
FIG. 10 is a flowchart depicting a method for detecting users sharing credentials according to some embodiments of the invention.

FIG. 10 is a flowchart depicting a method for detecting agent sharing credentials according to some embodiments of the invention. In step 1010, a computer processor may be configured to compare a voice signature to a plurality of voice models, where the voice signature describes one or more calls from a remote computer or a plurality of remote computers, which may be associated with a given agent. If the comparison results in a mismatch, embodiments may automatically terminate one or more of the calls associated with the voice signature (step 1020).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for detecting an agent sharing credentials, the method comprising:
   generating, by one or more processors, a voice signature for an agent participating in a call; and
   comparing, by the one or more processors, the voice signature to a pre-stored voice model associated with the agent,
   wherein the one or more processors are configured to automatically route the call from the agent participating in the call to a second agent if the comparing results in a mismatch.

2. The method of claim 1, comprising detecting, by the one or more processors, a logging of the agent into a given remote computer.

3. The method of claim 2, comprising creating, by the one or more of processors, a voice signature for the agent upon detecting the logging.

4. The method of claim 1, comprising establishing, by one or more of the processors, the pre-stored voice model describing the agent participating in the call.

5. The method of claim 1, comprising associating the pre-stored voice model with one or more identifiers, wherein the comparing of the voice signature to the pre-stored voice model includes matching one or more identifiers associated with the voice signature to one or more of the identifiers associated with the pre-stored voice model.

6. The method of claim 1, wherein the one or more processors are configured to automatically transmit an alert to a computing device of a supervisor if the comparing results in a mismatch.

7. The method of claim 1, wherein the comparing of the voice signature to the pre-stored voice model comprises calculating a similarity score and comparing the calculated similarity score to one or more predefined thresholds.

8. A computerized system for detecting an agent sharing credentials the system comprising:
   one or more processors,
   and
   a memory;
   wherein the one or more processors are configured to:
      generate a voice signature for an agent participating in a call;
      compare the voice signature to a pre-stored voice model associated with the agent; and
      automatically route the call from the agent involved in the call to a second agent if the comparison results in a mismatch.

9. The computerized system of claim 8, wherein the one or more processors are configured to detect a logging of the agent into a given remote computer.

10. The computerized system of claim 9, wherein the one or more processors are configured to create a voice signature for the agent upon detecting the logging.

11. The computerized system of claim 8, wherein the one or more processors are configured to establish the pre-stored voice model describing the agent participating in the call.

12. The computerized system of claim 8, wherein the one or more processors are configured to associate the pre-stored voice model with one or more identifiers, wherein the comparing of the voice signature to the pre-stored voice model includes matching one or more identifiers associated with the voice signature to one or more of the identifiers associated with the pre-stored voice model.

13. The computerized system of claim 8, wherein the one or more processors are configured to automatically transmit an alert to a computing device of a supervisor if the comparing results in a mismatch.

14. The computerized system of claim 8, wherein the comparing of the voice signature to the pre-stored voice model comprises calculating a similarity score and comparing the calculated similarity score to one or more predefined thresholds.

15. A method for detecting fraudulent call events, the method comprising:

in a computerized system comprising one or more processors, and a memory including a data store of a plurality of data items describing one or more remote computing devices associated with one or more agents:

generating, by one or more processors, one or more voiceprints for the one or more agents that are involved in one or more calls; and validating, by the one or more of processors, each of the one or more voiceprints against a voice model of the one or more voice models that are associated with the same agent; and automatically transferring a call of the one or more calls from the agent involved in the call to a second agent of the one or more agents for calls in which the validating is unsuccessful.

16. The method of claim 15, comprising receiving, by one or more of the processors, login credentials of the agent involved in the call from a given remote computing device of the one or more remote computing devices.

17. The method of claim 16, comprising constructing, by one or more of the processors, one or more voice models, each model describing one or more of the agents; and linking one of the one or more models to the login credentials.

18. The method of claim 17, comprising linking the one or more voiceprints with the received login credentials; and wherein the validating is performed based on the linked credentials.

\* \* \* \* \*